(12) United States Patent
Fan et al.

(10) Patent No.: US 7,323,318 B2
(45) Date of Patent: Jan. 29, 2008

(54) ASSAY FOR DISTINGUISHING LIVE AND DEAD CELLS

(75) Inventors: Jinhong Fan, San Mateo, CA (US); Vadim Kutsyy, Cupertino, CA (US); Eugeni A. Vaisberg, Foster City, CA (US)

(73) Assignee: Cytokinetics, Inc., South San Francisco, CA (US)

( * ) Notice: Subject to any disclaimer, the term of this patent is extended or adjusted under 35 U.S.C. 154(b) by 0 days.

(21) Appl. No.: 11/082,241

(22) Filed: Mar. 15, 2005

(65) Prior Publication Data

US 2006/0014135 A1   Jan. 19, 2006

Related U.S. Application Data

(60) Provisional application No. 60/588,907, filed on Jul. 15, 2004.

(51) Int. Cl.
  *C12Q 1/02* (2006.01)
(52) U.S. Cl. ....................................................... 435/29
(58) Field of Classification Search .................... None
  See application file for complete search history.

(56) References Cited

U.S. PATENT DOCUMENTS

| | | | |
|---|---|---|---|
| 4,818,710 A | 4/1989 | Sutherland et al. | |
| 4,922,092 A | 5/1990 | Rushbrooke et al. | |
| 4,959,301 A | 9/1990 | Weaver et al. | |
| 4,965,725 A | 10/1990 | Rutenberg | |
| 5,016,283 A | 5/1991 | Bacus et al. | |
| 5,162,990 A | 11/1992 | Odeyale et al. | |
| 5,163,095 A | 11/1992 | Kosaka | |
| RE34,214 E | 4/1993 | Carlsson | |
| 5,281,517 A | 1/1994 | Bacus et al. | |
| 5,287,272 A | 2/1994 | Rutenberg et al. | |
| 5,326,691 A | 7/1994 | Hozier | |
| 5,355,215 A | 10/1994 | Schroeder | |
| 5,526,258 A | 6/1996 | Bacus | |
| 5,548,661 A | 8/1996 | Price et al. | |
| 5,655,028 A | 8/1997 | Soll | |
| 5,710,022 A | 1/1998 | Zhu et al. | |
| 5,733,721 A | 3/1998 | Hemstreet, III et al. | |
| 5,741,648 A | 4/1998 | Hemstreet et al. | |
| 5,768,412 A | 6/1998 | Mitsuyama et al. | |
| 5,776,748 A | 7/1998 | Singhvi et al. | |
| 5,777,888 A | 7/1998 | Rine et al. | |
| 5,790,692 A | 8/1998 | Price et al. | |
| 5,790,710 A | 8/1998 | Price et al. | |
| 5,804,436 A | 9/1998 | Okun et al. | |
| 5,856,665 A | 1/1999 | Price et al. | |
| 5,893,095 A | 4/1999 | Jain et al. | |
| 5,919,646 A | 7/1999 | Okun et al. | |
| 5,932,872 A | 8/1999 | Price | |
| 5,962,250 A | 10/1999 | Gavin | |
| 5,962,520 A | 10/1999 | Smith et al. | |
| 5,976,825 A | 11/1999 | Hochman | |
| 5,985,549 A | 11/1999 | Singer et al. | |
| 5,989,835 A | 11/1999 | Dunlay et al. | |
| 5,991,028 A | 11/1999 | Cabib et al. | |
| 5,995,143 A | 11/1999 | Price et al. | |
| 6,007,996 A | 12/1999 | McNamara et al. | |
| 6,008,010 A | 12/1999 | Greenberger et al. | |
| 6,078,681 A | 6/2000 | Silver | |
| 6,083,763 A | 7/2000 | Balch | |
| 6,103,479 A | 8/2000 | Taylor | |
| 6,146,830 A | 11/2000 | Friend et al. | |
| 6,169,816 B1 | 1/2001 | Ravkin | |
| 6,222,093 B1 | 4/2001 | Marton et al. | |
| 6,345,115 B1 | 2/2002 | Ramm et al. | |
| 6,416,959 B1* | 7/2002 | Giuliano et al. ............. 435/7.2 |
| 6,615,141 B1 | 9/2003 | Sabry et al. | |
| 6,658,143 B2 | 12/2003 | Hansen et al. | |
| 6,956,961 B2* | 10/2005 | Cong et al. ................. 382/133 |
| 2002/0141631 A1 | 10/2002 | Vaisberg et al. | |
| 2002/0154798 A1 | 10/2002 | Cong et al. | |
| 2005/0267690 A1 | 12/2005 | Cong et al. | |
| 2005/0272073 A1 | 12/2005 | Vaisberg et al. | |

FOREIGN PATENT DOCUMENTS

| | | |
|---|---|---|
| EP | 0468705 | 1/1992 |
| EP | 0 317 139 | 2/1995 |

(Continued)

OTHER PUBLICATIONS

U.S. Appl. No. 60/127,339, filed Apr. 1999, Kapur et al.
U.S. Appl. No. 60/138,119, filed Jun. 7, 1999, Adams et al.
U.S. Appl. No. 60/120,801, filed Feb. 19, 1999, Wang et al.
U.S. Appl. No. 60,142,646, filed Jul. 6, 1999, Boyce et al.
U.S. Appl. No. 60/142,375, filed Jul. 7, 1999, Boyce et al.
U.S. Appl. No. 60/108,291, filed Nov. 13, 1998, Boyce et al.
U.S. Appl. No. 60/110,643, filed Dec. 1, 1998, Smith.
U.S. Appl. No. 60/140,240, filed Jun. 21, 1999, Dunlay et al.
U.S. Appl. No. 60/018,696, filed May 30, 1996, Taylor.
Printout from Q3DM Website (www.Q3DM.com), printed on Mar. 1, 2001, 30 Pages.
Montironi R., et al., "Computed Cell Cycle and DNA Histogram Analyses in Image Cytometry in Breast Cancer", Journal of Clinical Pathology, GB, London, vol. 46, No. 9, Sep. 1993, pp. 795-800.

(Continued)

*Primary Examiner*—Jon Weber
*Assistant Examiner*—Amanda P. Wood
(74) *Attorney, Agent, or Firm*—Beyer Weaver LLP

(57) ABSTRACT

Image analysis methods and apparatus are used for distinguishing live and dead cells. The methods may involve segmenting an image to identify the region(s) occupied by one or more cells and determining the presence of a particular live-dead indicator feature within the region(s). In certain embodiments, the indicator feature is a cytoskeletal component such as tubulin. Prior to producing an image for analysis, cells may be treated with a marker that highlights the live-dead indicator in the image. In the case of tubulin, the marker will co-locate with tubulin and provide a signal that is captured in the image (e.g., a fluorescent emission).

3 Claims, 12 Drawing Sheets
(6 of 12 Drawing Sheet(s) Filed in Color)

FOREIGN PATENT DOCUMENTS

| | | |
|---|---|---|
| EP | 0902394 | 3/1999 |
| WO | WO 87/02802 | 5/1987 |
| WO | WO 93/21511 | 10/1993 |
| WO | WO 94/11841 | 5/1994 |
| WO | WO 95/10036 | 4/1995 |
| WO | WO 95/22749 | 8/1995 |
| WO | WO 96/01438 | 1/1996 |
| WO | WO 96/09605 | 3/1996 |
| WO | WO 97/11094 | 3/1997 |
| WO | WO 97/20198 | 6/1997 |
| WO | WO 97/40055 | 10/1997 |
| WO | WO 97/43732 | 11/1997 |
| WO | WO 97/45730 | 12/1997 |
| WO | WO 98/05959 | 2/1998 |
| WO | WO 98/35256 | 8/1998 |
| WO | WO 98/38490 | 9/1998 |
| WO | WO 98/44333 | 10/1998 |
| WO | WO 98/45704 | 10/1998 |
| WO | WO 98/52018 | 11/1998 |
| WO | WO 99/05323 | 2/1999 |
| WO | WO 99/08091 | 2/1999 |
| WO | WO 99/17116 | 4/1999 |
| WO | WO 99/39184 | 8/1999 |
| WO | WO 99/44062 | 9/1999 |
| WO | WO 99/54494 | 10/1999 |
| WO | WO 99/67739 | 12/1999 |
| WO | WO 00/03246 | 1/2000 |
| WO | WO 00/06774 | 2/2000 |
| WO | WO 00/17624 | 3/2000 |
| WO | WO 00/17643 | 3/2000 |
| WO | WO 00/17808 | 3/2000 |
| WO | WO 00/26408 | 5/2000 |
| WO | WO 00/29984 | 5/2000 |
| WO | WO 00/31534 | 6/2000 |
| WO | WO 00/33250 | 6/2000 |
| WO | WO 00/43820 | 7/2000 |
| WO | WO 00/49540 | 8/2000 |
| WO | WO 00/50872 | 8/2000 |
| WO | WO 00/60356 | 10/2000 |
| WO | WO 00/65472 | 11/2000 |
| WO | WO 00/70528 | 11/2000 |
| WO | WO 01/35072 | 5/2001 |
| WO | WO 02/47032 A1 * | 6/2002 |

OTHER PUBLICATIONS

Giuliano K.A., et al., "Fluorescent-Protein Biosensors: New Tools for Drug Discovery", Trends in Biotechnology, GB, Elsevier Publications, Cambridge, vol. 16, No. 3, Mar. 1998, pp. 135-140.
Printout from Automated Cell Website (www.automatedcell.com) printed on Mar. 9, 2001, 24 pages.
Giuliano et al., "High-Content Screening: A New Approach to Easing Key Bottlenecks in the Drug Discovery *Process*", *J. Biomolecular Screening*, 2(4): 249 (1997).
Pauwels et al., "Determination of the Mechanism of Action of Anticancer Drugs by Means of the Computer- Assisted Microscope Image Analysis of Feulgen-Stained Nuclei", *J. Pharmacological and Toxicological Methods.* 37: 105-115 (1997).
Pauwels et al., "Monitoring Of Chemotherapy-Induced Morphonuclear Modifications By Means Of Digital Cell-Image Analysis", *I.* Cancer Res. Clin. Oncol., 119: 533-540 (1993).
Pauwels et al., "In Vitro Digital Cell Image Analysis of Morphonuclear Modifications Induced by Natural DNA- Interacting Anticancer Drugs in Three Neoplastic Cell Lines", *Meth. Find. Exp. Clin. Pharmacol..* 17(3):151-161 (1995).
Pauwels et al., "The Application of Computerized Analysis of Nuclear Images and Multivariate Analysis to the Understanding of the Effects of Antineoplastic Agents and Their Mechanism of Action", *Meth. Find. Exp. Clin.* Pharmacol, 15(2): 113-124 (1993).
PCT Search Report for Int'l Application No. PCT/US2004/022970, dated Dec. 1, 2004.
PCT Written Opinion for Int'l Application No. PCT/US2004/022970, dated Dec. 1, 2004.
Towner et al., "Non-Invasive in Vivo Magnetic Resonance Imaging Assessment of Acute Aflatoxin B1 Hepatotoxicity in Rats", BBA- General Subjects, Elsevier Science Publishers, NL, vol. 1475, No. 3, Jul. 26, 2000, pp. 314-320.
Sturgeon et al., "In Vivo Assessment of Microcystin-LR-induced Hepatoxicity in the rat using proton nuclear magnetic rezsonance ($^1$H-NMR) Imaging" BBA- General Subjects, Biochemica et Biophysica Acta 1454 (1999) pp. 227-235.
Sakai et al., Rapid and Sensitive Neurotoxicity Test Based on the Morphological Changes of PC12 Cells with Simple Computer-Assisted Image Analysis, Journal of Bioscience and Bioengineering, vol. 90, No. 1, 20-24. 2000.
Hall et al., "Two Methods of Assessment of Methotrexate Hepatotoxicity in Patients with Rheumatoid Arthritis", Annals of the Rheumatic Diseases 1991, vol. 50, No. 7, pp. 471-476.
Molinari et al., "Automated Image Analysis for Monitoring Oxidative Burst in Macrophages", Analytical and Quantitative Cytology and Histology, vol. 22, No. 5, Oct. 2000, pp. 423-427.
Istvan Cseke, "A Fast Segmentation Scheme for Whit Blood Cell Images", 1992 IEEE, pp. 530-533.
Hofland et al., "Role of Tumor-Derived Fibroblasts in the Growth of Primary Cultures of Human Breast-Cancer Cells: Effects of Epidermal Growth Facor and the Somatostatin Analogue Octreotide", 1995, *Int. J. Cancer*, vol. 60, pp. 93-99.
Rubas et al., "An Integrated Method to Determine Epithelial Transport and Bioactivity of Oral Drug Candidates in Vitro", 1996, *Pharmaceutical Research*, vol. 13, No. 1, pp. 23-26.
Serbouti et al., "Image segmentation and classification methods to detect leukemias", 1991, *Annual International Conference of the IEEE Engineering in Medicine and Biology Society*, vol. 13, No. 1, pp. 260-261.
Stearns et al., "Interleukin 10 (IL-10) Inhibition of Primary Human Prostate Cell-induced Angiogenesis: IL-10 Stimulation of Tissue Inhibitor of Metalloproteinase-1 and Inhibition of Matrix Metalloproteinase (MMP)-2/MMP-9 Secretion", 1999, *Clinical Cancer Research*, vol. 5, pp. 189-196.
Sundblad et al., "The use of image analysis and automation for measuring mitotic index in apical conifer meristems", 1998, *Journal of Experimental Botany*, vol. 49, No. 327, pp. 1749-1756.
Takayama et al. "Patterning cells and their environments using multiple laminar fluid flows in capillary networks", 1999, *Proc. Nat'l. Acad. Sci. USA*, vol. 96, pp. 5545-5548.
Hartwell et al., "Integrating Genetic Approaches into the Discovery of Anticancer Drugs", 1997, *Science*, vol. 278, pp. 1064-1068.
Ng and Sedighian, "Evaluating Multi-Dimensional Indexing Structures for Images Transformed by Principal Component Analysis", 1996, *SPIE*, vol. 2670, pp. 50-61.
Uria JA, et al., "Regulation of Collagenase-3 Expression in Human Breast Carcinomas in Mediated by Stromal-Epithelial Cell Interactions", Cancer Res Nov. 1, 1997; 57 (21):4882-8, Abstract.
Wang et al., "Immunolocalization of 6 in CHO cells with anti-His antibodies", Dec. 1999.
Cormack, Brendan P. et al., "FACS-optimized mutants of the green fluorescent protein (GFP)", 1996, *Gene*, vol. 173, pp. 33-38.
Craig, Elizabeth and Gross, Carol, "Is hsp70 the cellular thermometer?", 1991, *TIBS*, pp. 135-140.
Cubitt, Andrew B. et al., "Understanding, improving and using green fluorescent proteins", 1995, *TIBS*, vol. 20, pp. 448-455.
Dobson, Stephen P., "Dynamics of insulin-stimulated translocation of GLUT4 in single living cells visualized using green fluorescent protein", 1996, *FEBS Letters*, vol. 393, pp. 179-184.
Georget, V., et al., "Trafficking of the androgen receptor in living cells with fused green fluorescent protein—androgen receptor", 1997, *Molecular and Cellular Endocrinology*, vol. 129, pp. 17-26.
Lippincottt-Schwartz, Jennifer and Smith, Carolyn L., "Insights into secretory and endocytic membrane traffic using green fluorescent protein chimeras", 1997, *Current Opinion in Neurobiology*, vol. 7, pp. 631-639.
Misteli, Tom and Spector, David L., "Applications of the green fluorescent protein in cell biology and biotechnology", 1997, *Nature Biotechnology*, vol. 15, pp. 961-964.

Palm, Gottfried J. et al., "The structural basis for spectral variations in green fluorescent protein", 1997, *Nature Structural Biology*, vol. 4, No. 5, pp. 361-365.

Sakai, Kenji et al., "Purification and characterization of *N*-acyl-D-glutamate deacylase from *Alcaligenes xylosoxydans* subsp. *xylosoxydans* A-6", 1991, *FEBS Letters*, vol. 289, No. 1, pp. 44-46.

Shulga, Nataliya et al., "In Vivo Nuclear Transport Kinetics in *Saccharamyces cerevisiae*: A Role for Heat Shock Protein 70 during Targeting and Translocation", 1996, *The Journal of Cell Biology*, vol. 135, No. 2, pp. 329-339.

Tarasova, Nadya I. et al., "Visualization of G Protein-coupled Receptor Trafficking with the Aid of the Green Fluorescent Protein", 1997, *The Journal of Biological Chemistry*, vol. 272, No. 23, Issue of Jun. 6, pp. 14817-14824.

Welsh, Stephen and Kay, Steve A., "Reporter gene expression for monitoring gene transfer", 1997, *Current Opinion in Biotechnology*, vol. 8, pp. 617-622.

Blankenstein et al., Modular concept of a laboratory on a chip for chemical and biochemical analysis, © 1998, Biosensors & Bioelectronics, vol. 13, No. 3-4, pp. 427-438.

Pauwels et al., "Combination of Computerized Morphonuclear and Multivariate Analyses to Characterize In Vitro the Antineoplastic Effect of Alkylating Agents", J. Pharmacol. and Toxicol. Methods, 33(1): 34-45 (1995).

Weinstein et al., "An Information-Intensive Approach to the Molecular Pharmacology of Cancer", *Science*, 275: 43-349 (Jan. 17, 1997).

Ancin, Hakan et al., "*Advances in Automated 3-D Image Analysis of Cell Populations Imaged by Confocal Microscopy*", 1996, Cytometry, vol. 25, pp. 221-234.

Malpica, Norberto et al., "*Applying Watershed Algorithms to the Segmentation of Clustered Nuclei*", 1997, Cytometry, vol. 28, pp. 289-297.

Nilsson, Björn et al., "*Segmentation of Dense Leukocyte Clusters*", 2001, IEEE Workshop on Mathematical Methods in Biomedical Image Analysis, Kauai, Hawaii, pp. 221-227.

Boland et al. "Automated Recognition of Patterns Characteristics of Subcellular Structures in Fluorescence Microscopy Images". Cytometry 33:366-375 (1998).

Russ, J.C., "The Image Processing Handbook", Second Edition. Boca Raton: CRC Press. 1995. pp. 469-474 and 457-461.

Lu et al., "Hierarchical Shape Recognition Using Polygon Approximation and Dynamic Alignment", IEEE Paper CH2561-9, vol. 2, pp. 976-979, Apr. 1988.

D.L. Taylor, "The new vision of light microscopy", American Scientist 80:322-335, 1992.

K. A. Giuliano et al., "Measurement and manipulation of cytoskeletal dynamics in living cells", Current Opinion in Cell Biology 7:4-12, 1995.

BioDx, Internet Archive Way-Back Machine, Feb. 4, 1997 From website www.biodx.com.

A. Waggoner et al., "Multiparameter Fluorescence imaging microscopy: re- agents and instruments" Human Pathology, vol. 27, No. 5, 494-502, 1996.

Benveniste et al., "Characterization of Internalization and endosome formation of epidermal growth factor in transfected NIH-3T3 cells by computerized image-intensified three-dimensional fluorescence microscopy", The Journal of Cell Biology 109:2105-2115, 1989.

K.L. Carey et al., "Evidence using a green fluorescent protein-glucocorticoid receptor chimera that the RAN/TC4 GTPase mediates an essential function independent of nuclear protein import", The Journal of Cell Biology, vol. 133, No. 5, 985-996, 1996.

J. Kolega et al., "Quantitation of cytoskeletal fibers in fluorescence images: stress fiber disassembly accompanies dephosphorylation of the regulatory light chain of myosin II", Bioimaging 1:136-150, 1993.

D. L Farkas et al., "Multimode light microscopy and the dynamics of molecules, cells, and tissues", Annu. Rev. Physiol. 55:785-817, 1993.

W. Böcker et al., "Automated cell cycle analysis with fluorescent microscopy and image analysis", Phys. Med. Biol. 41:523-537, 1996.

R. Pepperkok et al., "System for quantitation of gene expression in single cells by computerized microimaging: Application to c-*fos* expression after microinjection of anti-casein kinase II antibody", Experimental Cell Research 204:278-285, 1993.

F. Hanakam, "Myristoylated and non-myristoylated forms of the pH sensor protein hisactophilin II: intracellular shuttling to plasma membrane and nucleus monitored in real time by a fusion with green fluorescent protein", The EMBO Journal 15(12):2935-43, 1996.

N.B. Cole, "Golgi Dispersal during microtubule disruption: Regeneration of Golgi stacks at Peripheral Endoplasmic Reticulum Exit sites," Molecular Biology of the Cell, vol. 7, 631-650, 1996.

B.M. Machiels "Subcellualr localization of proteasomes in apoptotic lung tumor cells and persistence as compared to intermediate filaments" European Journal of Cell Biology 70:250-259, 1996.

N. Yashuhara et al., "Essential Role of active nuclear transport in apoptosis" Genes to Cells 2:55-64, Jan. 1997.

M.V. Rogers, "Light on high -throughput screening: fluorescence-based assay technologies", Drug Discovery Today, vol. 2, No. 4, 156-160 Apr. 1997.

W. Böcker et al., "Image Processing algorithms for the automated micronucleus assay in binucleated human lymphocytes", Cytometry 19:283-294 (1995)

Frank Dellaert, "The Expectation Maximization Algorithm", College of Computing, Georgia Instititue of Technology, Technical Report No. GIT-GVU-02-20, Feb. 2002.

Steven S. Schreiber, "Mechanisms of Cell Death", Neurology and Anatomy & Neurobiology, Irvine Hall 114.

PCT Search Report for Int'l Application No. PCT/US2005/023970, dated Jan. 5, 2006.

PCT Written Opinion for Int'l Application No. PCT/US2005/023970, dated Jan. 5, 2006.

Great Britain Search Report dated Jun. 21, 2006 from related GB Application No. GB0604675.9.

Kutsyy et al., Assay for Distinguishing Live and Dead Cells, Cytokinetics, Inc., U.S. Appl. No. 11/355,258, filed Feb. 14, 2006, pp. 1-56.

\* cited by examiner

ASSAY FOR DISTINGUISHING LIVE AND DEAD CELLS

CROSS REFERENCE TO RELATED APPLCATIONS

This application claims priority under 35 USC § 119(e) from U.S. Provisional Patent Application No. 60/588,907, filed Jul. 15, 2004 and titled "ASSAY TO DISTINGUISH LIVE AND DEAD CELLS." This application is also related to the following U.S. Patent documents: U.S. patent application Ser. No. 09/729,754, filed Dec. 4, 2000, titled CLASSIFYING CELLS BASED ON INFORMATION CONTAINED IN CELL IMAGES; U.S. patent application Ser. No. 09/792,013, filed Feb. 20, 2001 (Publication No. US-2002-0154798-A1), titled EXTRACTING SHAPE INFORMATION CONTAINED IN CELL IMAGES; and U.S. patent application Ser. No. 10/719,988, filed Nov. 20, 2003, titled PREDICTING HEPATOTOXICITY USING CELL BASED ASSAYS. Each of the references listed in this section is incorporated herein by reference in its entirety and for all purposes.

BACKGROUND

This invention relates to image analysis of biological cells. More specifically, it relates to methods, computer program products, and apparatus for automatically analyzing images to determine whether individual cells within those images are alive or dead.

A number of methods exist for investigating the effect of a treatment or a potential treatment, such as administering a drug or pharmaceutical to an organism. Some methods investigate how a treatment affects the organism at the cellular level so as to determine the mechanism of action by which the treatment affects the organism. One approach to assessing effects at a cellular level involves capturing images of cells that have been subjected to a treatment. At times, it will be desirable to determine whether individual cells within a population of cells were alive or dead during image capture. For example, a researcher may need to quickly determine the relative numbers of live and dead cells in a population treated with a chemical compound or other stimulus. This may show the effectiveness of a treatment on pathogenic cells or the potential side effects of the treatment on benign cells.

Further, in some lines of research, phenotypic characteristics of dead cells may mask interesting morphological characteristics resulting from a treatment under investigation. Techniques that distinguish live and dead cells could unmask the effect by allowing researchers to focus on live cells and thereby determine the true impact of the treatment on live cells. Such techniques could also prevent researchers from mistakenly concluding that a general morphological feature of dead cells is a specific result of the treatment under investigation.

What is needed therefore is an improved image analysis technique for distinguishing live cells from dead cells.

SUMMARY

Image analysis methods and apparatus for distinguishing live and dead cells are described herein. These may involve segmenting an image to identify the region(s) of the image occupied by one or more cells and determining the presence or quantity of a particular live-dead indicator feature within the region(s). In some embodiments, the indicator feature is a cytoskeletal component such as tubulin. In other embodiments, different cellular components may serve this purpose. Prior to producing an image for analysis, cells may be fixed and treated with a marker that highlights the live-dead indicator in the image. In the case of tubulin, the marker will co-locate with tubulin and provide a signal that is captured in the image (e.g., a fluorescent emission).

One method of distinguishing live cells from dead cells in a population of cells comprises (a) providing one or more images of the population of cells; (b) automatically analyzing the image; and (c) automatically classifying at least one cell in the population of cells as live or dead.

In certain embodiments, automatically analyzing the image comprises analyzing one or more cytoskeletal components in at least one cell in the population of cells. In certain embodiments, analyzing one or more cytoskeletal components comprises determining the presence or absence of the one or more cytoskeletal components. In certain embodiments, analyzing one or more cytoskeletal components comprises determining the concentration of the one or more cytoskeletal components. In certain embodiments, analyzing one or more cytoskeletal components comprises determining the distribution of the one or more cytoskeletal components. In certain embodiments, analyzing one or more cytoskeletal components comprises determining the intensity of one or more markers for such one or more cytoskeletal components.

In certain embodiments, the population of cells is one cell. In certain embodiments, the population of cells is more than one cell.

In certain embodiments, tubulin is the cytoskeletal component. The tubulin may exist in any form, including polymerized states such as microtubules.

In some embodiments, the method further comprises automatically segmenting the image prior to determining the information about tubulin or other cytoskeletal component. In certain embodiments, segmentation comprises identifying nuclei of one or more cells in the image. In certain embodiments, segmentaion further comprises determining cell boundaries within the image. The cell boundaries can be determined using, for example, (i) a non-specific marker for proteins in the cell or (ii) a marker for a plasma membrane component.

In certain embodiments, the method further comprises (d) determining one or more morphological features of the cells in the image; and (e) determining the degree to which the one or more morphological features occurs in live cells and/or dead cells. Examples of morphological features include the overall cell shape, the structure of particular organelles such as Golgi or the nucleus, and the structure of particular cytoskeletal components.

In certain embodiments, the method is performed in a manner that allows live cells to continue functioning after treatment with a stimulus under investigation, but without any additional treatment intended to facilitate imaging of the live-dead indicator feature. Such additional treatments could, in some circumstances, interfere with the functioning of live cells and may even mask specific effects of a treatment (e.g., hide certain cellular morphological features of interest). In certain embodiments, the method further comprises exposing the population of cells to a stimulus; fixing the population of cells; and marking one or more cytoskeletal components in the population of cells with one or more markers that is specific for the one or more cytoskeleton components. Of course, the order be reversed; i.e., marking may be followed by fixing.

In certain embodiments, a stimulus is applied in different doses or levels to populations of cells. The phenotypic effects of the stimulus can then be determined as a function of dose or level. For at least two of the different doses or levels, the impact on live and dead cells is assessed. In certain embodiments, the method further comprises repeating steps (a)-(c) multiple times, each time for a different population of cells, such that the different populations of cells have been exposed to different doses or levels of a stimulus. The stimulus-paths of different stimuli or of different doses or levels of a stimulus can be compared to make assessments about the similarity of cellular responses to different stimuli or different doses or levels of a stimulus.

In certain embodiments, the method employs a mixture model of two distributions, one for live cells and one for dead cells. In certain embodiments, each distribution is a Gaussian distribution representing a distribution of the concentration of tubulin in a single cell (indicated by the mean intensity of a tubulin marker in the cell for example). In certain embodiments, the Gaussian distribution for the dead cells has a smaller mean than a Gaussian distribution for the live cells.

Also provided are methods of producing models for automatically distinguishing live cells from dead cells. In certain embodiments, the method comprises (a) providing one or more images of live cells and dead cells; (b) determining a level of one or more cytoskeletal components for multiple cells in the one or more images; and (c) from the levels obtained in (b), determining two Gaussian distributions for the levels of the one or more cytoskeletal components, one for live cells and one for dead cells. In certain embodiments, the levels of the one or more cytoskeletal components is a measure of the mean concentration of the one or more cytoskeletal components in a cell.

In certain embodiments, the one or more images provided in (a) include images of positive and negative control populations having relatively high percentages of dead and live cells.

In certain embodiments, the images are segemented prior to determining a level of one or more cytoskeletal components for multiple cells in one or more images by automatically identifying nuclei of individual cells in the images and/or automatically determining cell boundaries within the image.

In certain embodiments, determining two Guassian distributions for the levels of the one or more cytoskeletal components, comprises (i) providing an empirical distribution of the level of the cytoskeletal component in individual cells, which can be visualized as a histogram of the number of cells in the images versus the level of the cytoskeletal component in an individual cell; and (ii) using this empirical distribution to determine a mixture of the two Gaussian distributions. In certain embodiments, an Expectation Maximization (EM) procedure is used to identify a mean and a standard deviation for each of the two Guassian distributions.

Also provided are computer program products including machine-readable media on which are stored program instructions for implementing at least some portion of the methods described above. Any of the methods described herein may be represented, in whole or in part, as program instructions that can be provided on such computer readable media. Also provided are various combinations of data and data structures generated and/or used as described herein.

These and other features and advantages of the present invention will be described in more detail below with reference to the associated figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Introduction

Tubulin and related cytoskeletal markers may serve as indicators of whether a cell is alive or dead. Other cellular components may also serve this purpose. It has been found, for example, that the total quantity of cellular protein, as indicated by particular markers, indicates whether a cell is live or dead. Much of the description in this application refers to cytoskeletal components, and particularly tubulin, as examples of indicators for determining whether a cell is alive or dead. However, the invention extends to other cellular components whose presence or levels within a cell also correspond to live and dead cells.

Models and methods of generating such models are provided take advantage of these discoveries. The models can automatically classify a cell as either alive or dead depending upon the level of tubulin found in the cell. In certain embodiments, automated image analysis techniques are employed to identify cells in an image, determine the level of tubulin in each identified cell, and based on the level of tubulin, classify individual cells as alive or dead. In one embodiment, the models are "mixture models" comprised of two ranges of tubulin levels, a lower range indicating dead cells and an upper range indicating live cells. In a specific embodiment, each range is represented as a Gaussian distribution with its own mean and standard deviation. The invention pertains to both methods of producing such models and methods of applying such models to sample cells to determine whether such cells are alive or dead.

Figure 1:
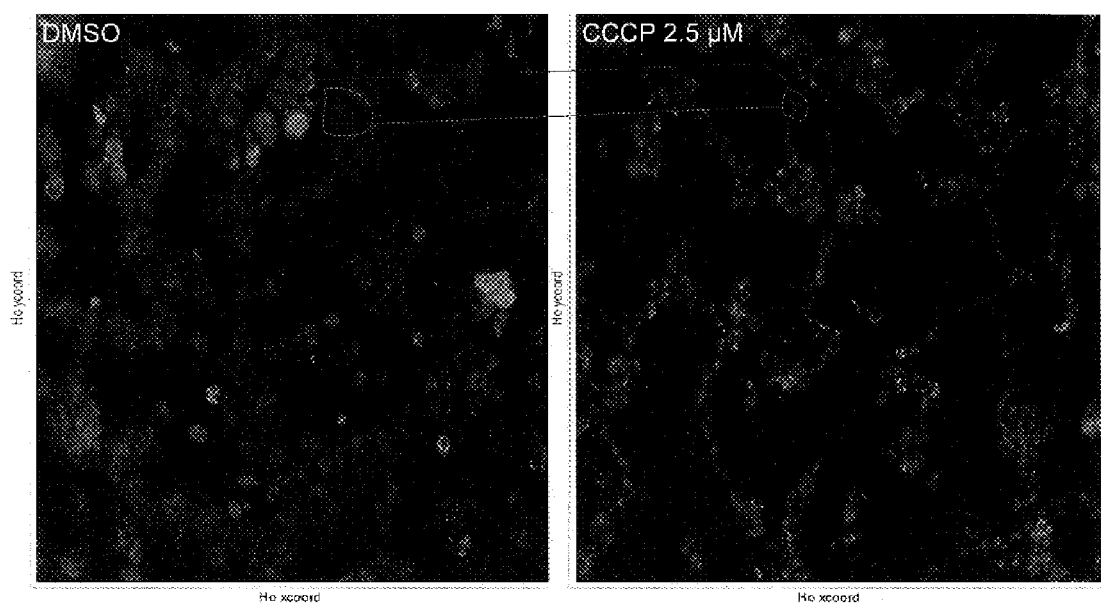
FIG. 1 presents two images of cells marked with a marker for tubulin: a left image of a control population of cells treated with DMSO, and a right image of a test population of cells treated with the compound CCCP, which kills cells.

FIG. 1 presents two images of cells: a left image of a control population of cells treated with DMSO, and a right image of a test population of cells treated with the compound carbonyl cyanide 3-chlorophenylhydrazone (herein CCCP), a poison which acts on the cellular respiratory pathway. After treatment with DMSO or CCCP, the cells were fixed and stained with multiple markers. Three of these markers are shown in the image: red indicates DNA, blue indicates tubulin, and green indicates the trans-Golgi network. The figure shows that a population of cells treated with CCCP contains far fewer cells with significant tubulin concentration (as indicated by a reduction in the number of cells having a blue color in comparison to those in a control population treated with DMSO). Note that individual cells are identified (whether alive or dead) by a small red area in the central region. This red area is associated with DNA in the cell nucleus. The number of cells having a green color (for the trans-Golgi network marker) is greatly increased in the CCCP treated cells image. This is not necessarily an indication that the dead cells have increased levels of Golgi. Rather, it merely indicates that the blue tubulin intensity is not present at a level that masks the green Golgi signal.

In the context of this invention, a cell is said to be "dead" when it ceases to carry on any significant cellular functions such as respiration, mitosis, etc. Thus, the term "dead," as used herein, corresponds to the conventional meaning of the term. Note that the invention applies to cells that have died by any of the various processes that typically lead to cell death. These processes include apoptosis, necrosis, paraptosis, etc.

As indicated, a dead cell may be identified by a reduced level of tubulin in the region bounded by the cell. In certain embodiments, other cytoskeletal proteins, such as actin, may also serve as indicators of cell death. Further, the tubulin, actin, or other cytoskeletal indicator protein(s) may take various forms including microtubules, unpolymerized tubulin, actin filaments, intermediate filaments, and various other assemblies, each of which may, in certain embodiments, indicate whether a cell is alive or dead. In other embodiments, various non-cytoskeletal proteins serve as indicators of cell death. In one example, the overall protein content of a cell, as presented by the Alexa 647 succinimidyl ester (Alexa 647), also indicates whether a cell is alive or dead.

The level of tubulin or other cytoskeletal indicator in a cell may be measured as the intensity of a marker for the indicator appearing in an image of the cell. The local intensity of a tubulin marker in an image generally corresponds directly to the local tubulin concentration at particular regions within a cell. Examples of tubulin markers include fluorescently labeled antibodies to tubulin (e.g., DM1-α, YL1-2, and 3A2 antibodies), cells expressing GFP (or YFP, etc.) labeled tubulin, and the like.

In general, a marker is linked to or otherwise co-located with a cell component under investigation. It serves as a labelling agent and should be detectable in an image of the relevant cells. In other words, the location of the signal source (i.e., the location of the marker within the cells) appears in the image. The marker should provide a strong contrast to other features in a given image. To this end, the marker may be luminescent, radioactive, fluorescent, etc. Various stains and compounds may serve this purpose. Examples of such compounds include fluorescently labelled antibodies to the cellular component of interest, fluorescent intercalators, and fluorescent lectins. The antibodies may be fluorescently labeled either directly or indirectly. The labelling agent typically emits a signal at an intensity related to the concentration of the cell component to which the agent is linked. For example, the signal intensity may be directly proportional to the concentration of the underlying cell component.

In certain embodiments, the image analysis for determining whether a cell was alive or dead is used in conjunction with additional image analysis for identifying one or more other relevant morphological characteristics or biological states of the cell (that may result from treatment with a stimulus under investigation). Of course, cellular components associated with these other morphological characteristics also may be highlighted by marking. Examples of such components include proteins and peptides, lipids, polysaccharides, nucleic acids, etc. Sometimes, the relevant component will include a group of structurally or functionally related biomolecules such as micells or vesicles. Alternatively, the component may represent a portion of a biomolecule such as a polysaccharide group on a protein, or a particular subsequence of a nucleic acid or protein. In certain embodiments, sub-cellular organelles and assemblies serve as the components (e.g., the Golgi, cell nuclei, the cytoskeleton, etc.).

In certain embodiments, markers for DNA or other nuclear component (e.g., histones) are employed to facilitate segmentation. Examples of such markers include DAPI or Hoechst 33341 stains for DNA (available from Molecular Probes, Inc. of Eugene, Oreg.) and antibodies to histones such as an antibody for a phosphorylated histone, e.g., phospho-histone 3 (pH3). Another option is to use cells expressing a GFP-histone2B (or any other GFP-tagged protein that functionally co-localizes with nuclear DNA). In addition to markers for the cell nucleus, other markers can be employed facilitate identification of cells. Examples of such markers include Alexa Flour 647 available from Molecular Probes, Eugene, Oreg. (a non-specific marker for free amine groups in proteins) and markers that bind to particular proteins in the cell membrane.

As indicated above, the signal from the Alexa 647 marker may be employed, in certain embodiments, for the purpose of indicating whether a cell is alive or dead. Relatively low signal from the marker indicates that the cell is dead. Other markers for overall protein content may be employed for the same purpose in certain embodiments.

As used herein, the term "stimulus" refers to something that may influence the biological condition of a cell. Often the term is used synonymously with "agent" or "manipulation" or "treatment." Stimuli may be materials, radiation (including all manner of electromagnetic and particle radiation), forces (including mechanical (e.g., gravitational), electrical, magnetic, and nuclear), fields, thermal energy, and the like. General examples of materials that may be used as stimuli include organic and inorganic chemical compounds, biological materials such as nucleic acids, carbohydrates, proteins and peptides, lipids, various infectious agents, mixtures of the foregoing, and the like. Other general examples of stimuli include non-ambient temperature, non-ambient pressure, acoustic energy, electromagnetic radiation of all frequencies, the lack of a particular material (e.g., the lack of oxygen as in ischemia), temporal factors, etc.

One class of stimuli is chemical compounds including compounds that are drugs or drug candidates and compounds that are present in the environment. Related stimuli involve suppression of particular targets by siRNA or other tool for preventing or inhibiting expression. The biological impact of these and other stimuli may be manifest as phenotypic changes that can be detected and characterized in accordance with embodiments described herein.

The term "image" is used herein in its conventional sense, but with notable extensions. For example, the concept of an image extends to data representing collected light intensity and/or other characteristics such as wavelength, polarization, etc. on pixel-by-pixel basis within the relevant field of view. An "image" may also include derived information such as groups of pixels deemed to belong to individual cells—as a result of segmentation. The image need not ever be visible to researchers or even displayed in a manner allowing visual inspection. In certain embodiments, computational access to the pixel data is all that is required.

Creating Models to Automatically Distinguish Live Cells and Dead Cells

Figure 2:
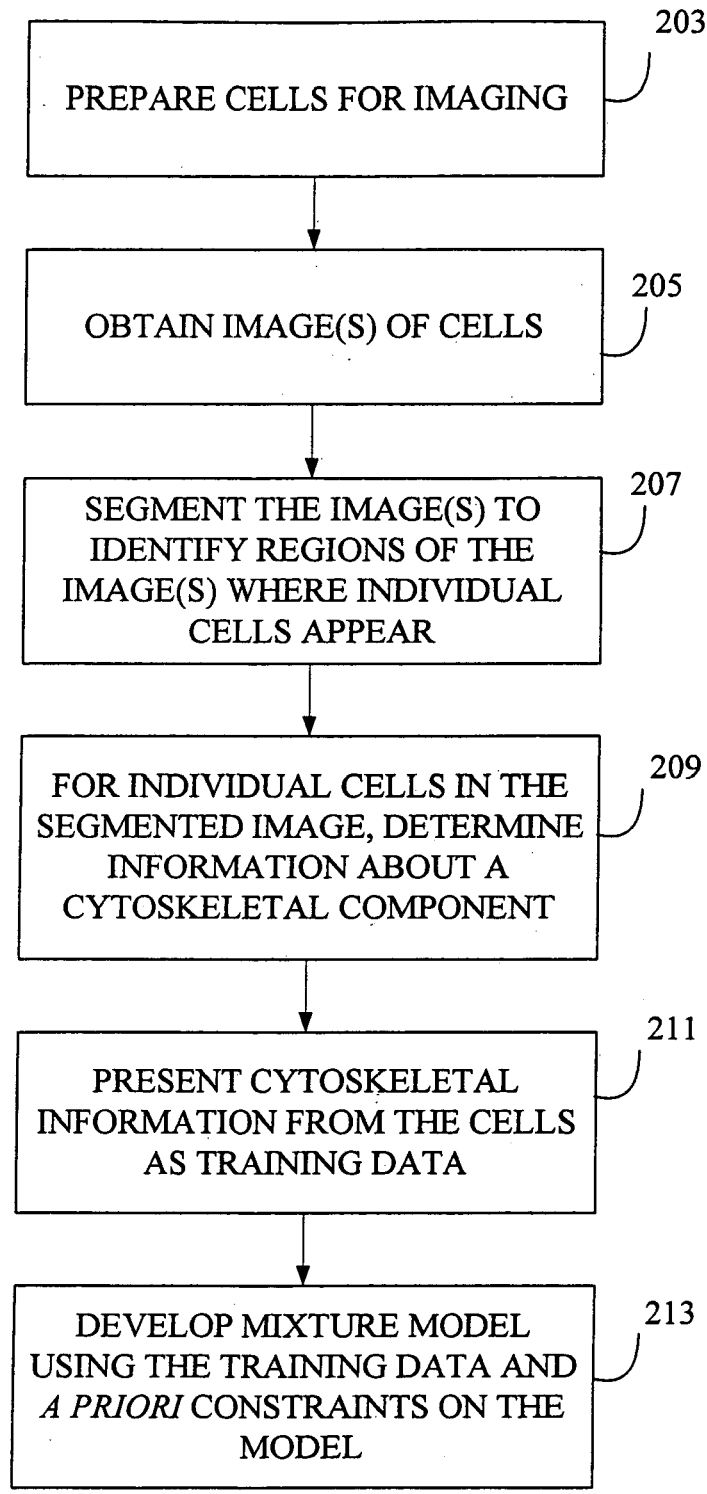
FIG. 2 is a flowchart depicting one method for producing a model that can be used to distinguish live and dead cells in accordance with an embodiment of this invention.

FIG. 2 presents a flowchart depicting one method for producing a model that can be used to determine whether an individual cell is live or dead. As shown in a block 203, the method begins by preparing the cell populations that are to be used for imaging. In certain embodiments, a sandwich culture is employed. In this preliminary operation, some cell populations are treated as controls (assumed to have a high fraction of cells that are alive) and other cell populations are treated as test samples (assumed to have a significant fraction of cells that are dead). Upon completion of treatment, cells are fixed and stained with appropriate markers. The test cells will all have been treated with a compound or other stimulus known to kill a significant percentage of the cells in a given population. Together, the control and test cell populations provide relatively large numbers of live and dead cells. The size of these populations should be large enough to provide a training set sufficient to generate a model that can reliably distinguish live cells from dead cells. Typically, at this stage in the process, one does not know exactly how many cells have been killed and how many remain alive (in either the control set or the test set).

As illustrated in FIG. 2, block 205, the process obtains images of the cells provided in 203. The images and imaging conditions are chosen to allow extraction of relevant features that can be used to identify individual cells and characterize them as live or dead. These images provide the raw data for a training set used to build a live-dead model. From the cellular images, the process extracts multiple cellular features, at least one of which allows segmentation of the cells and at least one of which provides a measure of the concentration of a cytoskeletal component (e.g., tubulin) over all regions of the cell. In some cases a morphological indicator of interest is also taken with the image (e.g., the trans-Golgi network marker shown in FIG. 1).

In certain embodiments, the method first identifies the locations of the discrete cells in the image. This may be accomplished by segmentation. See block 207 in FIG. 2.

Segmentation can be performed by various techniques including those that rely on identification of discrete nuclei and those that rely on the location of cytoplasmic proteins or cell membrane proteins. Exemplary segmentation methods are described in U.S. Patent Publication No. US-2002-0141631-A1 of Vaisberg et al., published Oct. 3, 2002, and titled "IMAGE ANALYSIS OF THE GOLGI COMPLEX," and U.S. Patent Publication No. US-2002-0154798-A1 of Cong et al. published Oct. 24, 2002 and titled "EXTRACTING SHAPE INFORMATION CONTAINED IN CELL IMAGES," both of which are incorporated herein by reference for all purposes.

In a preferred approach, individual nuclei are first located to identify discrete cells. Any suitable stain for DNA or histones may work for this purpose (e.g., the DAPI and Hoechst stains mentioned above). Individual nuclei can be identified by performing, for example, a thresholding routine on images taken at a channel for the nuclear marker. After the nuclei are identified, cell boundaries can then be determined around each nucleus. In one embodiment, a non-specific marker for proteins such as Alexa 647 is used with an appropriate algorithm to identify cell boundaries. In another embodiment, a marker for a cell membrane protein is used for this purpose. In either case, a watershed algorithm has been found useful in determining boundaries of individual cells within the images.

Figure 3A:
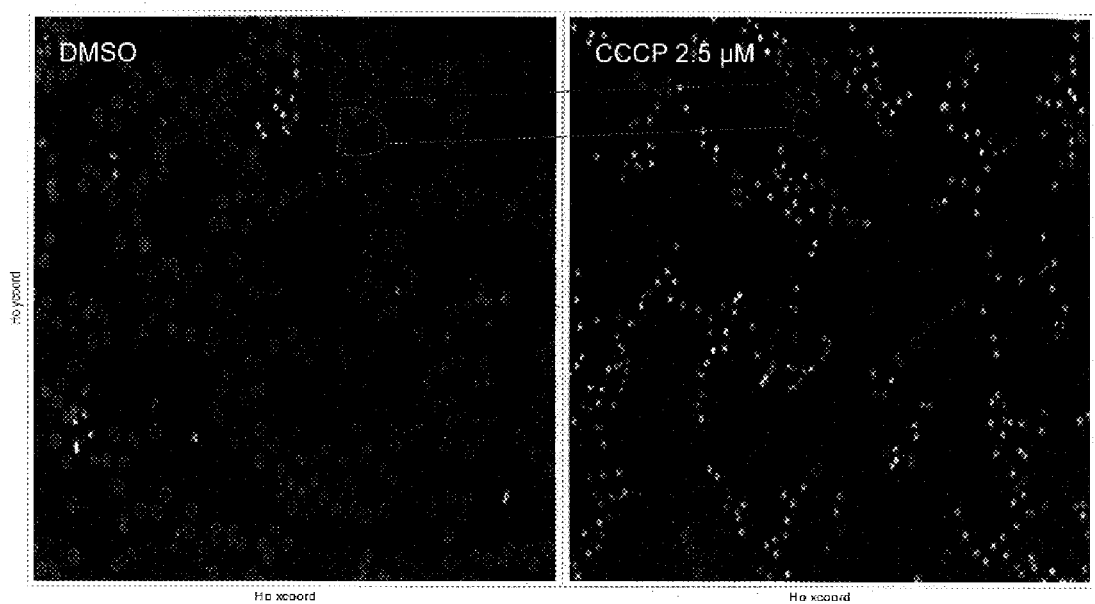
FIG. 3A presents a pair of images in which the nuclei of individual cells in two different cell populations have been identified as part of a segmentation procedure. A DNA stain was imaged to permit identification of the nuclei.
Figure 3B:
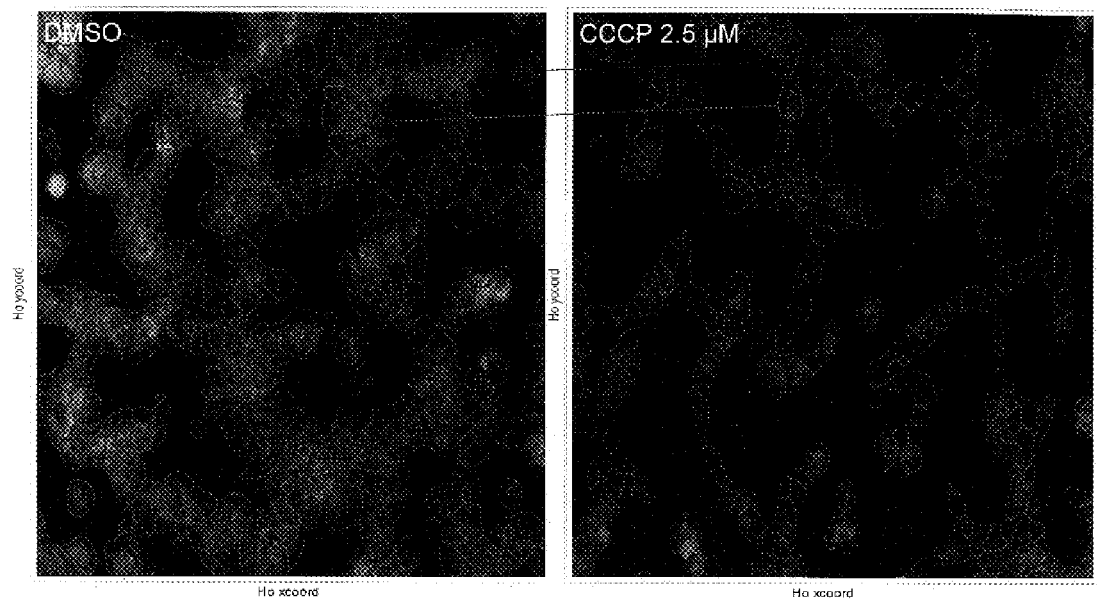
FIG. 3B presents the images of the cell populations of FIG. 3A, but with the boundaries of the individual cells identified to complete the cell segmentation procedure. A non-specific protein stain was imaged to permit identification of the cellular boundaries.

An exemplary two-step segmentation process is illustrated in FIGS. 3A and 3B. FIG. 3A presents the result of the first step. As shown there, two images (the left one for a control population treated with DMSO and the right one for a test population treated with 2.5 µM CCCP) show nuclei circled in the interiors of individual cells. Cellular DNA was stained with Hoechst 33341, which emits fluorescence at a wavelength selectively collected in the FIG. 3A image to permit identification of the individual nuclei. Each such nucleus is presumed to belong to a separate cell.

FIG. 3B presents the results of the second step of the cell segmentation procedure. As shown, the cell populations of FIG. 3A are again presented, but this time at the Alexa 647 channel (i.e., the bright regions in the image locate the source of radiation emitted at the wavelength of Alexa 647). Because this stain shows the location of cellular proteins, the segmentation procedure can locate a cell boundary for each nucleus identified in FIG. 3A. The cell boundaries so identified are circled within the images. Each cell boundary defines a collection of pixels that are deemed to belong to a particular cell. For image processing those pixels are used extracting information about the particular cell in question.

After the boundaries of each cell have been identified, the appropriate live-dead indicator feature can be extracted on a cell-by-cell basis. See block 209. As indicated above, the intensity of a marker for tubulin (an indicator of local tubulin concentration within the cell) can be identified for each pixel in a given cell. Each cell will be characterized on the basis of its level of tubulin, whether based on an average value over all pixels in the cell, a maximum or minimum value within the cell, or some other indicator of tubulin quantity. In a preferred embodiment, the mean tubulin marker intensity is calculated over the pixels in a cell and the resulting value is employed as the live-dead indicator feature.

Figure 3C:
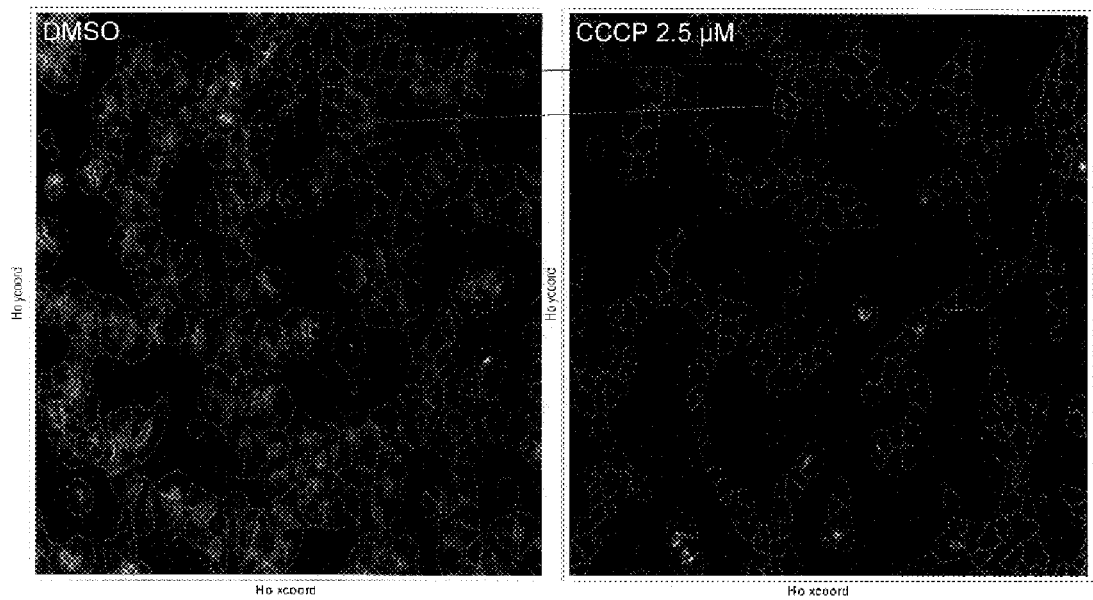
FIG. 3C again presents the cell populations of FIG. 3A, but with cell boundaries elucidated as in FIG. 3B and with a tubulin marker highlighted to allow distinction of live and dead cells.

Additional images are presented in FIG. 3C, highlighting the marker DM1-α for tubulin. FIG. 3C shows the same cell populations as in FIGS. 3A and 3B, but at the channel for the wavelength emitted by DM1-α. As indicated previously, the left panel shows a control cell population treated with DMSO and the right panel shows a test cell population treated with 2.5 µM CCCP. Note that live and dead cells can be usually distinguished by visual inspection. Those showing brighter (grey-white) internal regions will be deemed to be live by the methods of this invention, while those without significant brightness (indicating low levels of tubulin) will be deemed to be dead. While this distinction can be made visually, typical implementations of this invention accomplish this automatically, using only computational processing of the data representing the image. In the FIG. 3C images, there is, as expected, a far higher percentage of dead cells in the CCCP treated population than in the control population.

After the data for the cytoskeletal component (or other live-dead indicator) has been produced on a per cell basis, that data is organized or made available in a form that can be used to generate a model for distinguishing live and dead cells. See block 211 of FIG. 2. In a specific example, processing logic provides the live-dead indicator in the form of a histogram showing the number of cells (from the control and test populations) having particular levels of live-dead indicator feature. In other words, one axis presents various levels of the live-dead indicator feature and the other axis presents numbers of cells. In a specific embodiment described herein, the indicator parameter of interest is mean tubulin intensity for a given cell. That is, for any given cell, the tubulin intensity is detected for each and every pixel within the boundary defined for that cell. The mean of the pixel intensities for each cell is then obtained and used as a data point for constructing the histogram. Each cell has its own value of mean tubulin intensity. Cells with higher values of mean tubulin intensity are deemed to be live.

As indicated above, other measures of tubulin may be employed in embodiments of this invention. For example, in some embodiments, the maximum tubulin intensity found in a cell serves as the live-dead indicator for the cell. In other embodiments, the total tubulin intensity within a cell serves as the indicator.

Figure 4A:
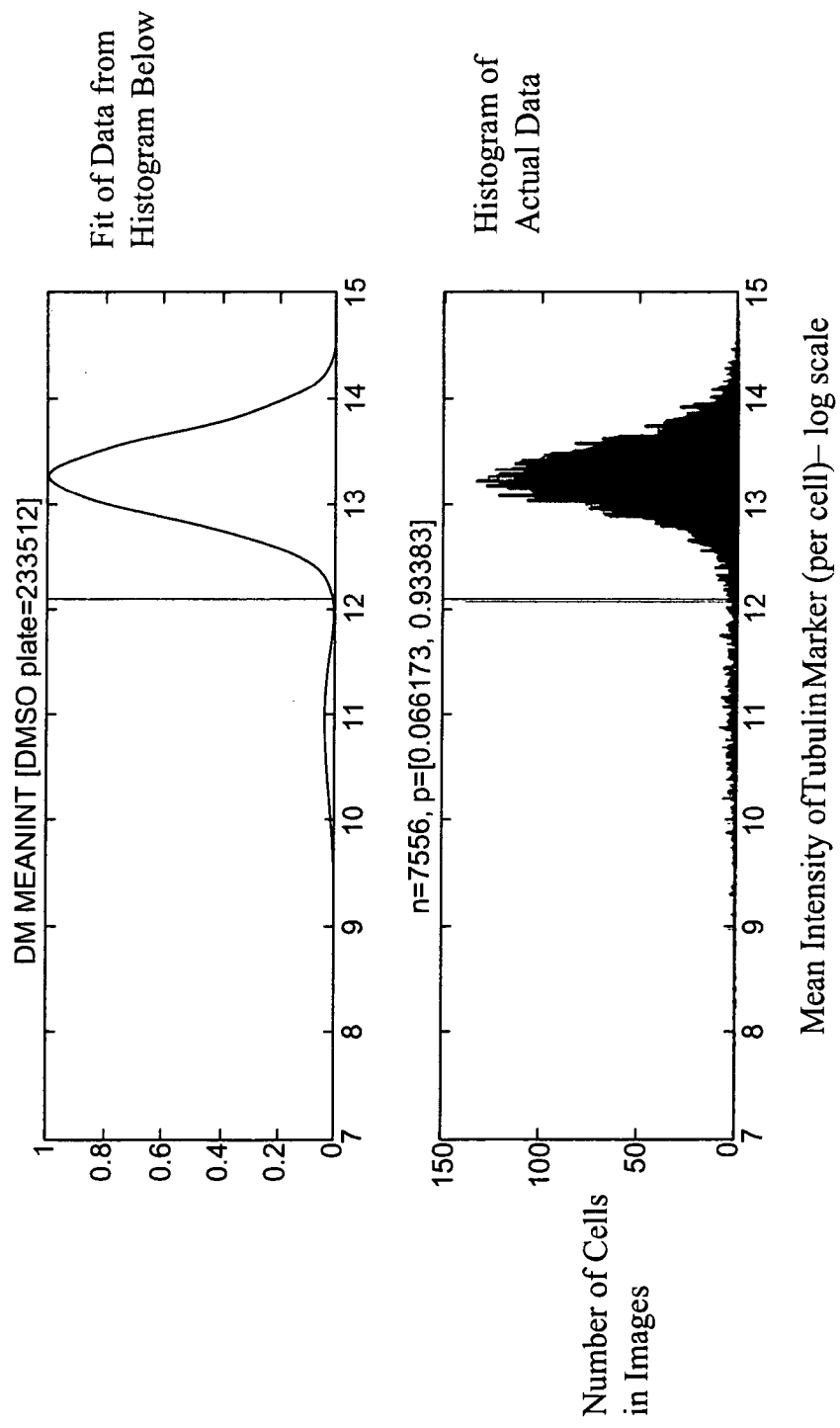
FIG. 4A is a histogram of mean tubulin marker intensity (per cell). The cells providing the data in this histogram were generated from a control population treated with DMSO and have relatively high percentage of live cells.
Figure 4B:
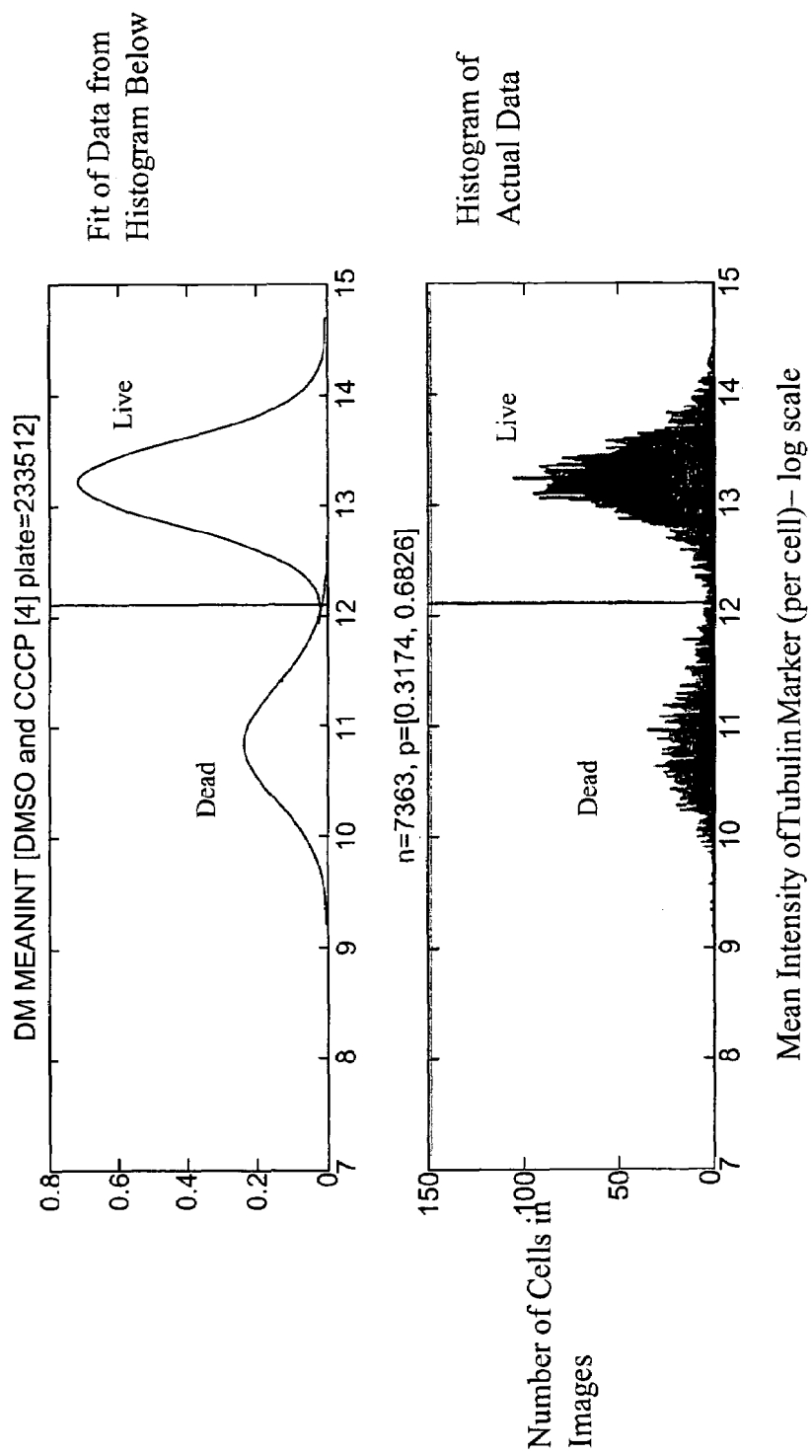
FIG. 4B is a histogram similar to that of FIG. 4A, but comprised of data taken from test cells treated with the compound CCCP, as well as control cells treated with DMSO. The histogram peak associated with dead cells is much more pronounced in FIG. 4B than in FIG. 4A.

FIGS. 4A and 4B show histograms of mean tubulin marker intensity taken on a per cell basis. The horizontal axis shows the level of mean tubulin marker intensity, with increasingly higher values moving left to right. The vertical axis shows the number of cells found to have particular levels of the mean tubulin marker intensity.

The histogram of FIG. 4A was produced using only control cells treated with DMSO. Thus, in this histogram, most of the data is found in a single peak associated with live cells. In other words, most of the data is found in the right side of the histogram (between the arbitrary values of 12 and 15 on a log scale). However, there is a smaller and wider distribution found to the left of mean intensity value 12. The data in this region of the histogram represents dead cells. As shown in the figure, the raw data is presented in a lower histogram and the "fitted" model is shown in an upper graph. Because the data in the live and dead regions of the histogram is assumed to distribute into two Gaussian distributions, the model produces two Gaussians.

When CCCP treated cells are included together with the control cells, two separate peaks are seen more clearly, each associated with a separate range of mean tubulin marker intensity values. This is illustrated in FIG. 4B where the data in the histogram was taken from test cells as well as control cells. The test cells were treated with various concentrations of CCCP, ranging from 0.625 µM CCCP to 5 µM CCCP for 24 hours. As shown, a relatively large fraction of the cells have a mean tubulin marker intensity well below that associated with the control cells. In other words, the histogram peak associated with dead cells is much more pronounced in FIG. 4B than in FIG. 4A.

As indicated, the models produced using the method depicted here can classify cells as live or dead based on their mean tubulin marker intensity. A confidence can be ascribed to the classification based upon how close the measured intensity value comes to one of the means in the model. Because the model is essentially a "mixture" of two distributions it is referred to as a "mixture model."

In typical embodiments, the mixture model takes the form of a heterogeneous mixture of Gaussian distributions (e.g., the two Gaussian distributions from the histogram shown in FIG. 4B). Each of these Gaussian distributions may be unambiguously described by the location of its mean and the size of a standard deviation. The models are deemed "heterogeneous" when the two Gaussian distributions are not constrained to have the same values of standard deviation, which is typically the case with models of this invention. As indicated, the mixture model assumes that the data of the training set falls into two distinct Gaussian distributions, one for live cells and the other for dead cells.

Returning to FIG. 2, a mixture model is developed using the training data and one or more a priori constraints. See block 213. In certain embodiments, this involves fitting the indicator data, which is provided in an appropriate format. In addition, constraints on the mixture model (e.g., the number of peaks and the separation of the means of those peaks) are provided. Such constraints are dictated by the underlying biological phenomenon being investigated or deduced empirically. In most instances, a model for distinguishing live and dead cells will be constrained to have two Gaussian distributions, one for live cells and another for dead cells. See the upper panels in FIGS. 4A and 4B. The fact that the model contains two separate Gaussian distributions is an a priori constraint employed to ensure that the resulting model assumes the proper form.

In addition to providing the training data and any necessary constraints, the process may require initial guesses for the various parameters defining the mixture model. Examples of the parameters in question include values of the mean and standard deviation for each Gaussian in the mixture model and additionally the proportions of live and dead cells in the training set. Thus, in one example, the following information is provided with the training set: a number of separate Gaussian distributions (as indicated, two will usually be sufficient), an initial guess for the mean of each Gaussian distribution, an initial guess for the standard deviation of each Gaussian distribution, and an initial guess for the proportion of cells in the training set that are live and the proportion that are dead.

Various types of algorithms may be employed to identify the model parameters using data from the training set. Maximum likelihood estimation is most commonly used approach. The Expectation Maximization (EM) algorithm for maximal likelihood estimation is one suitable numeric likelihood maximization technique. Other maximization techniques may be employed as well. In addition other estimation techniques can be used, such as classical constrained maximum likelihood, MiniMax estimation, and Baysian modelling with estimation using Gibbs sampling. In particular, if distributions other then Gaussian are modelled, an algorithm other than EM may be better suited. Regardless of the particular model generation algorithm employed, the resulting model discriminates between live and dead cells using only mean tubulin intensity (or whatever other particular parameters identified as the best indicator for distinguishing live cells from dead cells). The model takes the form of two Gaussian distributions, each characterized by the position of a mean and the value of a standard deviation.

Generally, the fitting procedure assumes that the mathematical form of the model will be a mixture of Gaussians, and based on this it finds a mean and a standard deviation for each Gaussian. To do this, the procedure employs the multiple constraints (e.g., the number of peaks, the separation of these peaks, etc.). The technique converges after a few iterations of refining the guesses of the means and standard deviations.

At convergence, the maximum likely estimation provides values for the individual means, the individual standard deviations, and the proportions of the live and dead cells in the training set that best fits the data.

As explained, an EM algorithm can be used to find maximum likelihood estimators and hence the most likely values of the means and standard deviations for the distributions in the model. See McLachlan, Geoffrey J., and T. Krishnan (1997), *The EM algorithm and extensions*, John Wiley and Sons. See also See F. Delaert (2002), *The Expectation Maximization Algorithm*, College of Computing, Georgia Institute of Technology, Technical Report number GIT-GVU-02-20, both of which are incorporated herein by reference for all purposes.

Choosing Live-Dead Discrimination Features

While tubulin is one suitable live-dead indicator feature, it is not the only feature that can distinguish live cells from dead cells. Note, however, that some other features may require special treatment of living cells. Typically, the living cells must be treated with a marker or other agent unrelated to the stimulus under investigation. Living cells are often sensitive these treatments. Hence, use of indicators working on live cells often requires special handling of the cells and limits the choice of markers to those that do not significantly interfere with normal cell functioning or cellular morphologies to be analyzed. Ideally, as with DM1-α for tubulin, the marker employed for distinguishing live cells from dead cells can be applied to cells immediately before imaging, after they have been fixed. Such markers need not be applied to live cells and thus require no special treatment before cells are fixed, marked, and then imaged.

Of course, this invention is not limited to such markers. For example, certain embodiments employ a fusion protein of tubulin and green fluorescent protein or similarly functioning proteins.

In some embodiments, the indicator parameter will have a separate relevance, apart from distinguishing live cells from dead cells. For example, the parameter can indicate an interesting phenotypic characteristic that helps characterize a mechanism of action, a level of toxicity, or other feature under study in conjunction with the live versus dead discrimination.

For some applications, tubulin levels meet all the above criteria. A marker such as DM1-α can be applied after the cells are fixed and ready for imaging. It need not be applied while the cells are alive. Further, tubulin and other cytoskeletal components often present interesting morphologies or manifestations of mechanism of action that indicate underlying cellular conditions. Tubulin markers, for example, show the morphology of mitotic spindles and can therefore be used to characterize a cell's mitotic state in some applications—in addition to distinguishing live cells from dead cells.

Using Models to Discriminate Live and Dead Cells

Models for discriminating live cells from dead cells are used to identify sub-populations of live and dead cells. While such models may be produced in accordance with the methodology described above, this need not be the case. The exact source and development of the model is not critical.

Figure 5:
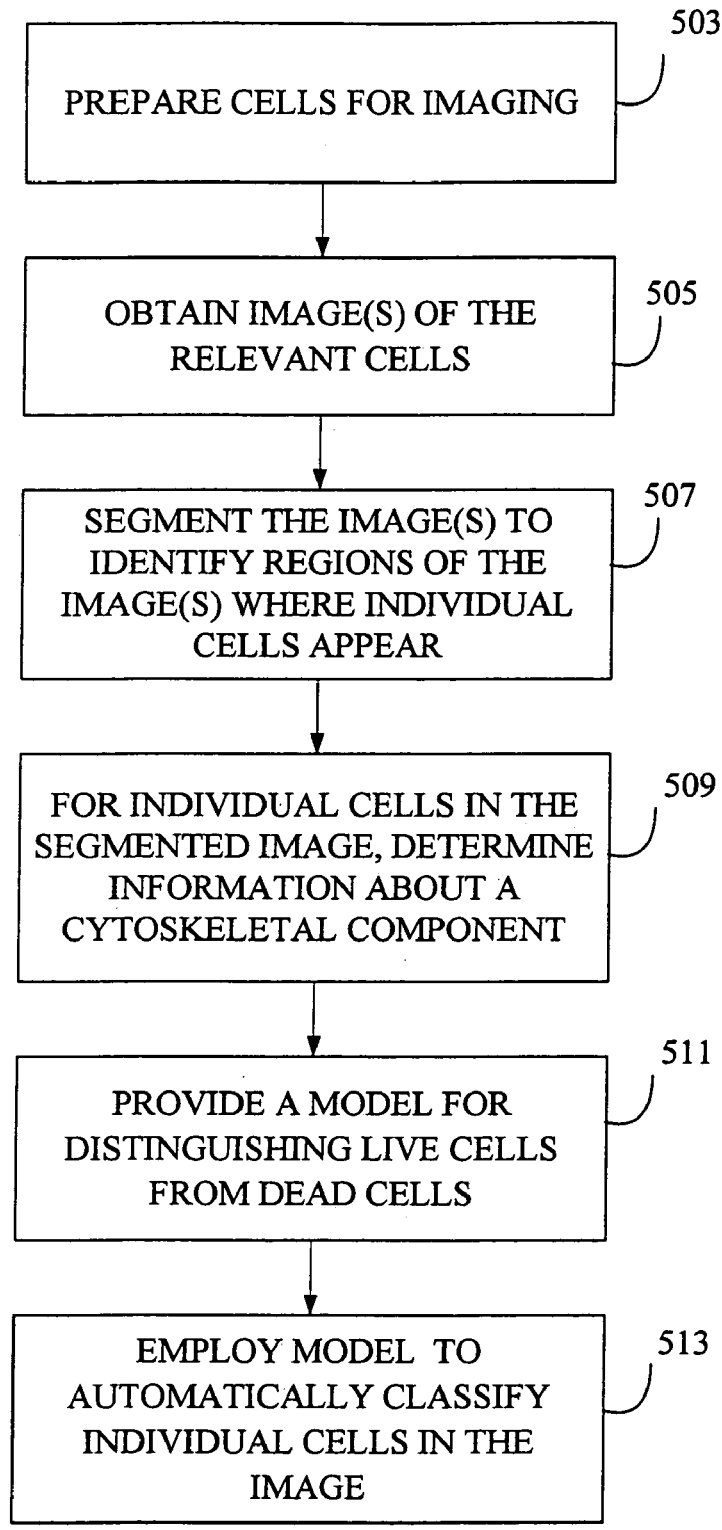
FIG. 5 is a flowchart depicting one method for using a model to distinguish live and dead cells in accordance with an embodiment of this invention.

FIG. 5 is a flowchart presenting a typical process for using a model to distinguish live cells from dead cells. In the depicted embodiment, the first four operations of the flowchart shown in FIG. 5 correspond to the first four operations presented in FIG. 2. In FIG. 5, these operations are (1) preparing cells for imaging, (2) obtaining images of the relevant cells and extracting the required features for performing the assay, (3) segmenting the images, including defining boundaries of individual cells, and (4) determining the mean tubulin intensity on a cell-by-cell basis. See blocks 503, 505, 507, and 509.

In FIG. 5, block 511, the process provides a model for distinguishing live cells from dead cells; e.g., a model prepared as described in the context of FIG. 2. Many different types of models can be used, some of which are generated to be widely applicable to different cell types and different assays, and others of which are specific to a very narrow range of samples. In certain embodiments, the model is generated from positive and negative controls known to impact cell populations in different ways, one of which is an effective cell-killing agent.

In certain embodiments, a separate model is generated for each specific condition or assay under consideration. In certain embodiments, a new model is generated for each separate study, involving each separate plate or group of plates. For example, a given plate the indicator is measured for all cells in all wells. These are then analyzed empirically to identify two distributions, one for live cells and the other for dead cells. The two distributions serve as the model for classifying the cells in the study. In this embodiment, the model is essentially generated on the fly, for each plate or group of plates under consideration and applied to all wells on the plate (i.e., the wells that were employed to generate the model).

Returning to FIG. 5, after the relevant model has been provided or selected, it is applied to the cells. Specifically, the model is employed to automatically classify individual cells in the image on a cell-by-cell basis. See block 513. If a mixture model is employed, as is usually the case, application of that model simply involves identifying the mean tubulin marker intensity of a given cell (or other live-dead discriminating feature) and determining whether that mean intensity level falls within the Gaussian distribution for live cells or the Gaussian distribution for dead cells. Depending on how close a cell's mean tubulin marker intensity level comes to one or the other of the Gaussian distribution means in the mixture model (and within the standard deviations of those Gaussian distributions), the model may also be able to ascribe some confidence to its classification of the cell in question.

Applications

As should be apparent, the invention has many different applications. In certain applications, the invention merely determines the percentages or absolute numbers of live and dead cells in samples that have been treated with particular stimuli. One extension of this basic application produces a "stimulus-response" characterization in which increasing levels of applied stimulus are employed. (e.g., increasing concentration of a particular drug under investigation). The proportions of live and dead cells are then observed to change with changing levels of the stimulus. This may indicate the potency of the stimulus, its mechanism of action, etc. See for example, U.S. patent application Ser. No. 09/789,595, filed Feb. 20, 2001, titled CHARACTERIZING BIOLOGICAL STIMULI BY RESPONSE CURVES and U.S. Provisional Patent Application No. 60/509,040, filed Jul. 18, 2003, titled CHARACTERIZING BIOLOGICAL STIMULI BY RESPONSE CURVES, both of which are incorporated herein by reference for all purposes.

In certain applications, the invention applies the live versus dead discrimination to more clearly characterize some morphological change arising from a given stimulus. Such change may be more pronounced in one or the other of live and dead cells. In fact, some morphological effects might affect only live or dead cells (or might affect them in fundamentally different ways). A raw analysis of such effect on an entire population of cells—that includes both live and dead cells—without separately considering the effect on live and dead cells could mask the specific impact of the stimulus on live or dead cells.

In view of the above, the flowchart of FIG. 5 may be extended to include an additional operation in which the automated image processing extracts a feature (sometimes in addition to the ones required for segmentation and live-dead discrimination) from the cell images on a cell-by-cell basis. The Golgi feature shown in FIG. 1 is one example of such additional feature. In this additional operation, the image analysis algorithm determines how the additional feature is separately manifest in the live and dead cell populations. Examples of cellular/morphological conditions found to be exhibited differently in live and dead cells are presented in FIGS. 6A through 6C.

Figure 6A:
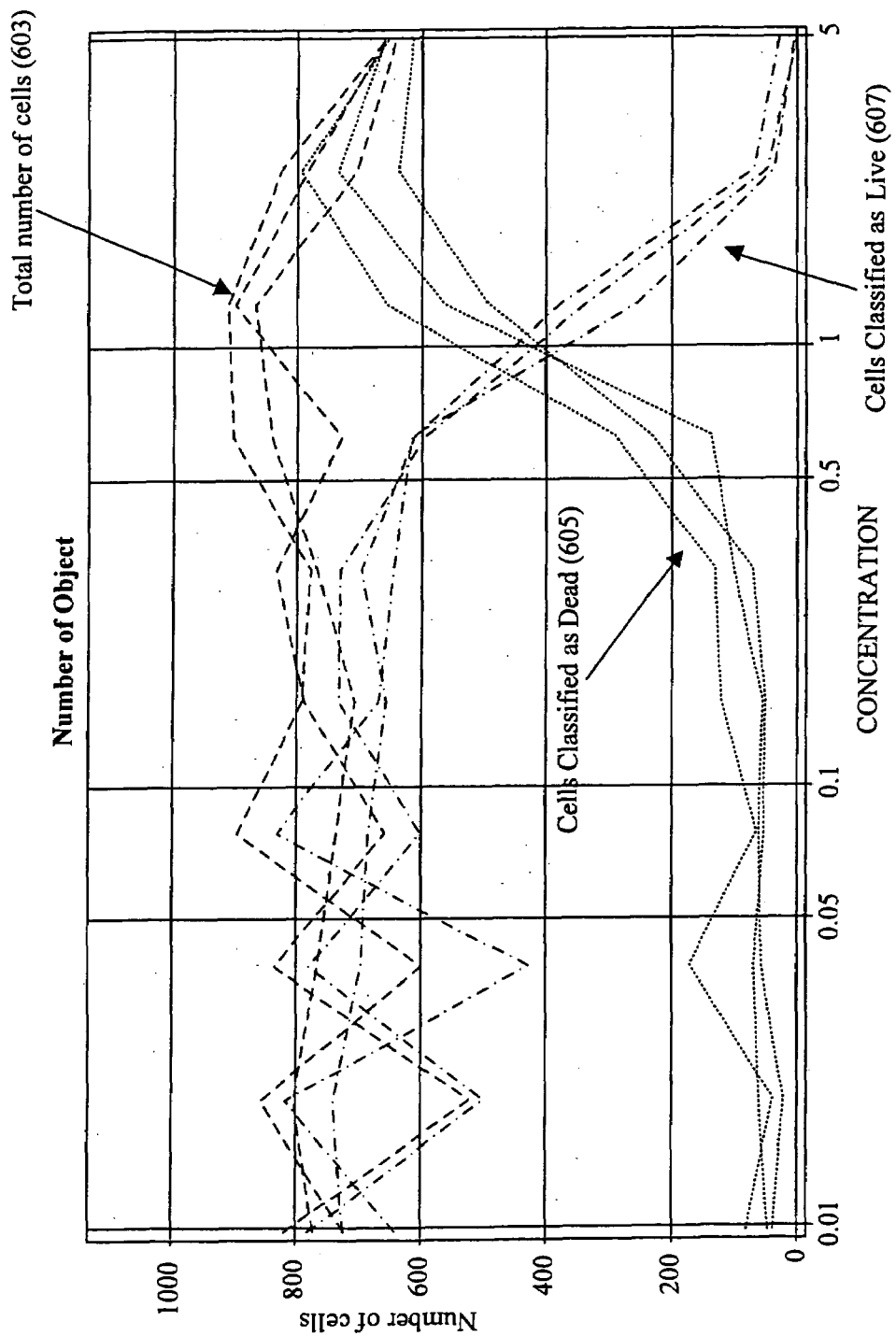
FIG. 6A is a graph showing how CCCP concentration affects the total number of cells in an image, as well as the number of dead cells and the number of live cells.

FIG. 6A shows how CCCP concentration affects the total number of cells in an image, as well as the number of dead cells and the number of live cells. In this plot, the total number of cells (603) is shown to remain approximately constant across three different samples of around 800 cells each. These are identified as a number of objects (determined by the number of DNA spots). Three paths 605 show the number of dead cells, while three paths 607 show the number of live cells. As shown, starting at a normalized concentration of about 0.5 µM CCCP, the number of dead cells begins to increase dramatically, while the number of live cells begins to decrease at roughly the same rate. Note that the live cells were discriminated from dead cells using the mean DM1-α intensity of each cell.

Figure 6B:
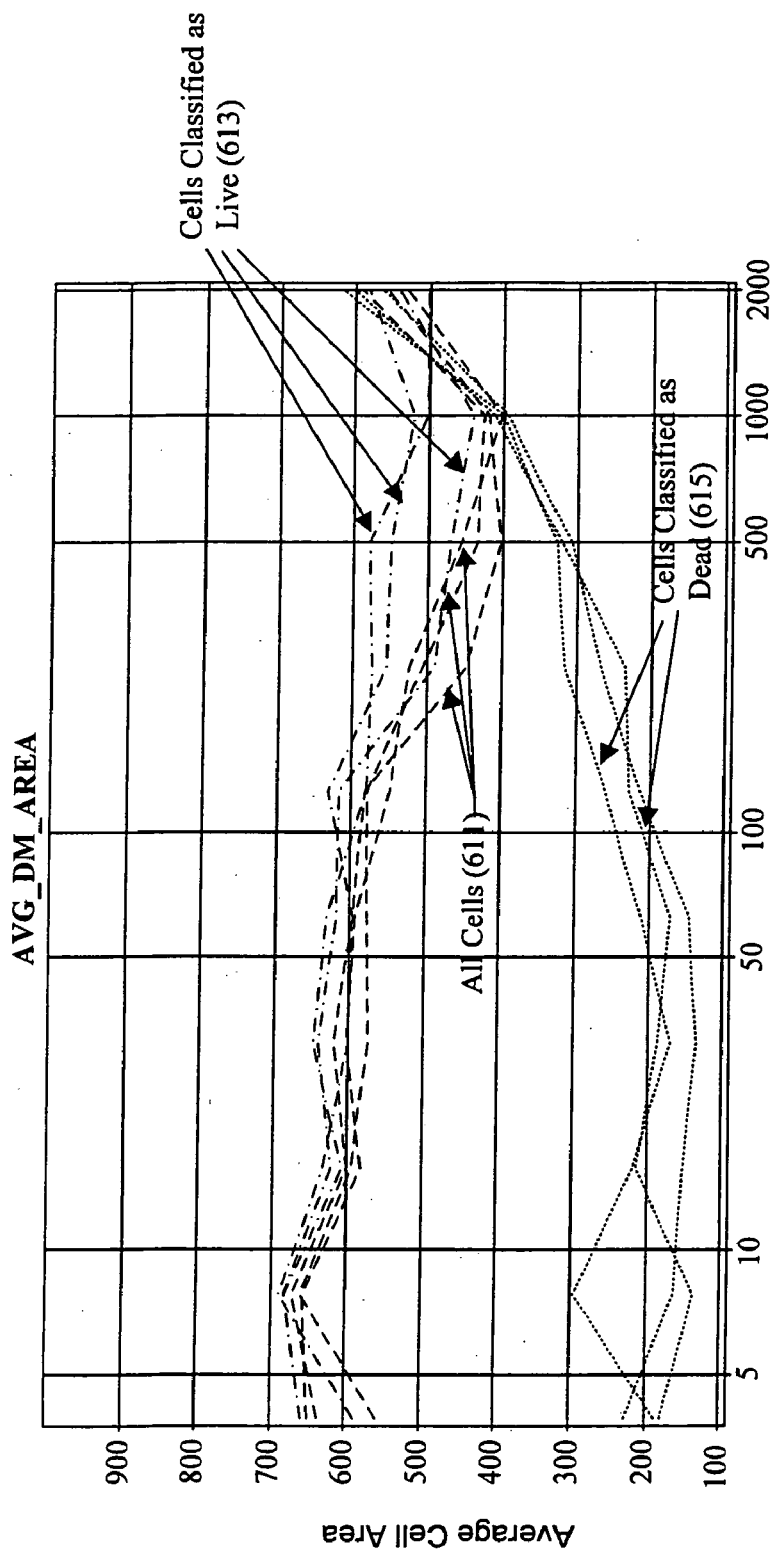
FIG. 6B is a graph showing the effect of a different drug (diclofenac) on the total cell area in live cells and dead cells.

FIG. 6B shows the effect of a different drug (diclofenac) on the total cell area. The area was determined from a pixel count within the boundary determined by segmentation. Of particular interest, this plot shows that the area of the dead cells 615 begins to increase rather dramatically at a particular concentration (the arbitrary concentration of 100 shown in this plot). In contrast, the total area of the live cells 613 gradually decreased beginning at approximately the same concentration. A simple consideration of the average cell area for all cells (including live cells and dead cells) would likely mask the fact that the higher concentrations of the drug cause dead cells to become progressively larger. The effect of the live cells masks, somewhat, the effect on the dead cells. This result would not have been observed without the assay of this invention, which distinguishes live cells from dead cells. Note that the average area of the live and dead cells together is shown as lines 611 in FIG. 6B. Note also that, as with the plot in FIG. 6A, the live cells were discriminated from dead cells using the mean DM1-α intensity of each cell.

Figure 6C:
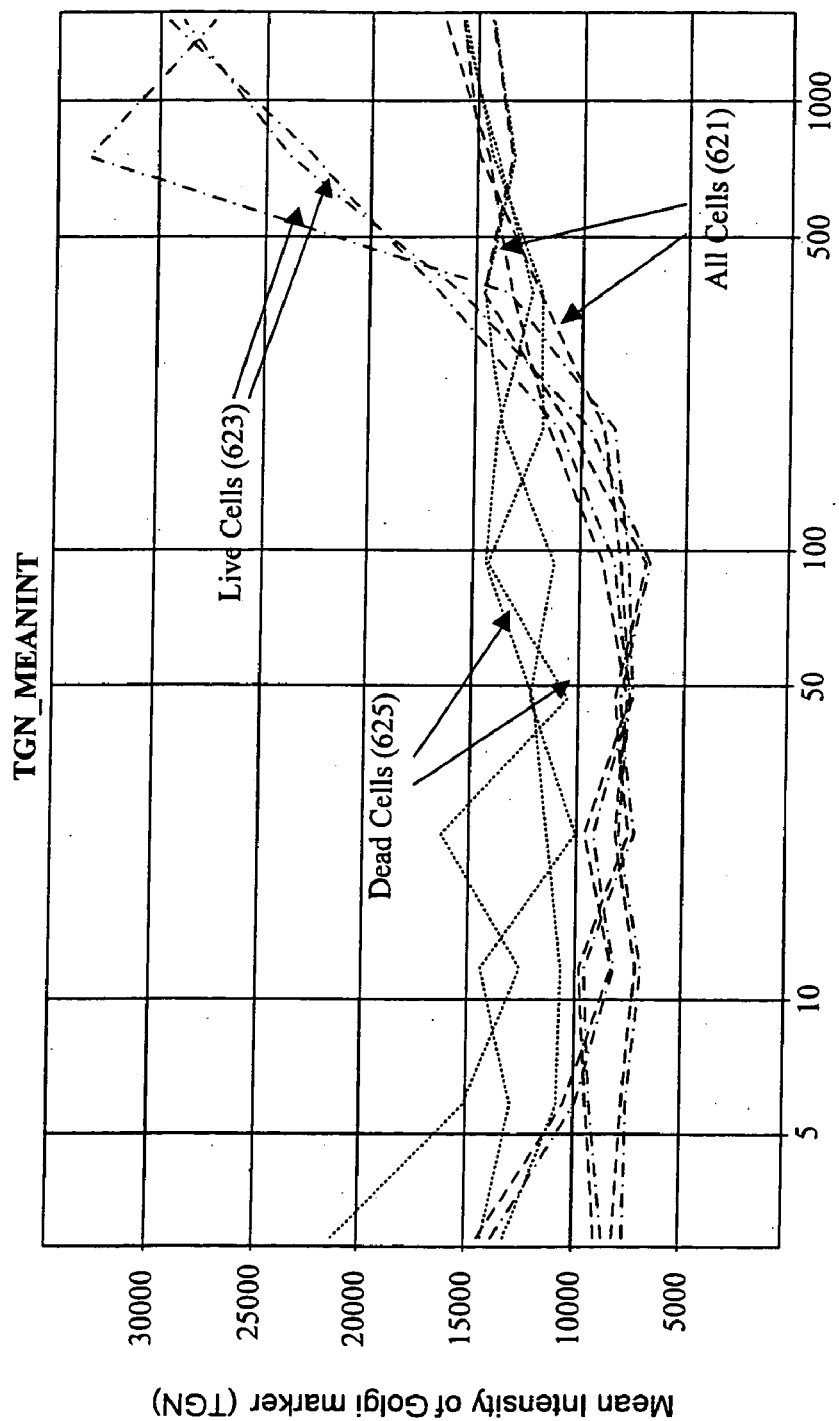
FIG. 6C is a graph showing how another drug (tacrine) impacts the mean intensity (on a cell-by-cell basis) of a marker for the TGN (trans-Golgi network) in live cells and dead cells.

Finally, FIG. 6C shows how another drug (tacrine) impacts the mean intensity (on a cell-by-cell basis) of a marker for the TGN (trans-Golgi network). Of interest in this plot, increasing concentrations of tacrine dramatically increase the mean Golgi marker intensity signal in live cells (lines 623), while having a relatively minimal affect on the Golgi intensity signal in dead cells (lines 625). This is another situation in which simply considering the live and dead cells together (the data paths 621) would have masked the separate effect of the drug on a morphological indicator (mean TGN marker intensity) on a separate class of cells (the live cells). As with FIGS. 6A and 6B, the live-dead discrimination in FIG. 6C was made using mean DM1-α intensity (per cell).

Software/Hardware Implementation Examples

Certain embodiments of the present invention employ processes acting under control of instructions and/or data stored in or transferred through one or more computer systems. Embodiments of the present invention also relate to an apparatus for performing these operations. This apparatus may be specially designed and/or constructed for the required purposes, or it may be a general-purpose computer selectively configured by one or more computer programs and/or data structures stored in or otherwise made available to the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines is shown and described below.

In addition, embodiments of the present invention relate to computer readable media or computer program products that include program instructions and/or data (including data structures) for performing various computer-implemented operations associated with analyzing images of cells or other biological features, as well as classifying stimuli on the basis of how they impact cell viability or selectively act on subpopulations of cells. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine in accordance with this invention. The code may specify input, output, calculations, conditionals, branches, iterative loops, etc.

Figure 7:
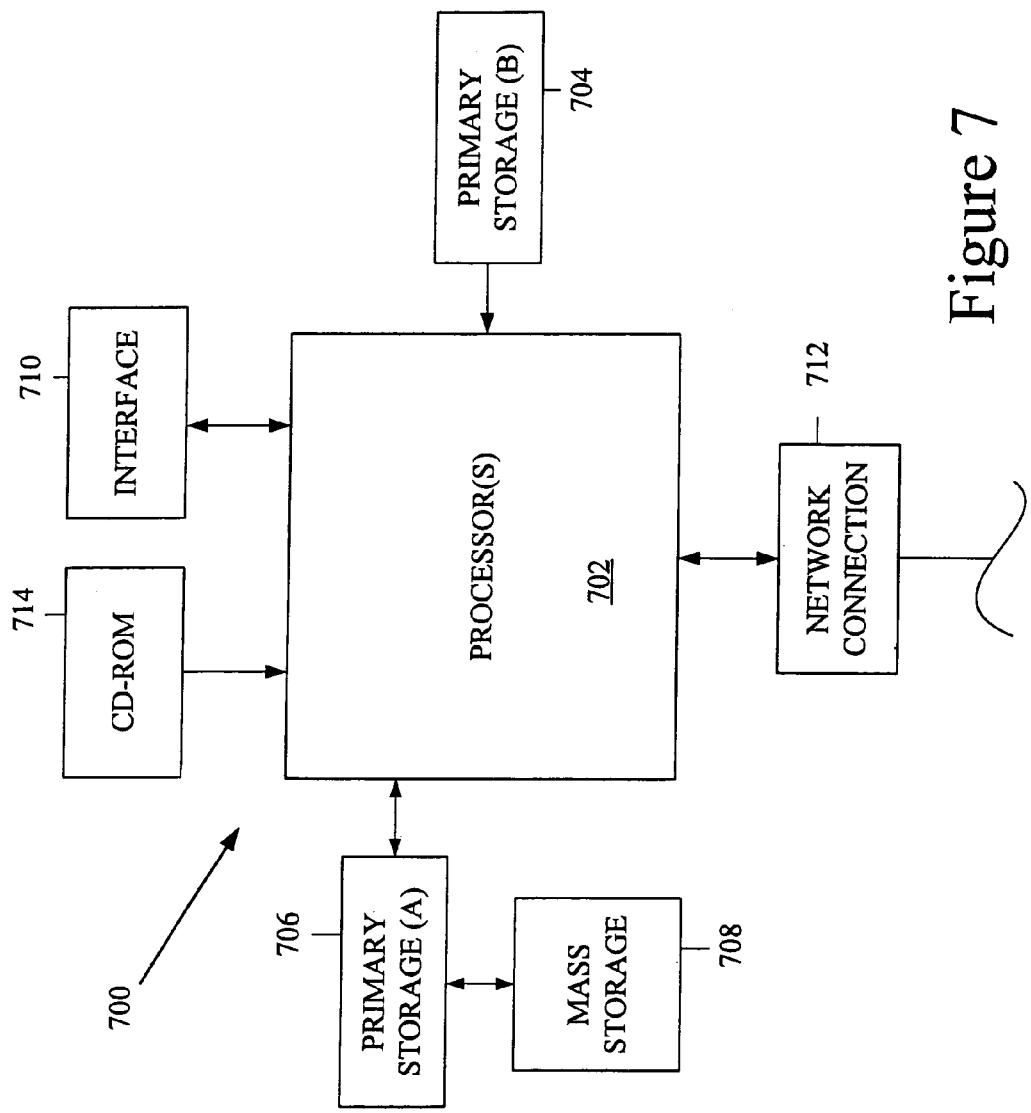
FIG. 7 is a diagrammatic representation of a computer system that can be used with the methods and apparatus of the present invention.

FIG. 7 illustrates, in simple block format, a typical computer system that, when appropriately configured or designed, can serve as a computational apparatus of this invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and non-programmable devices such as gate array ASICs or general-purpose microprocessors. In the depicted embodiment, primary storage 704 acts to transfer data and instructions uni-directionally to the CPU and primary storage 706 is used typically to transfer data and instructions in a bi-directional manner. Both of these primary storage devices may include any suitable computer-readable media such as those described above. A mass storage device 708 is also coupled bi-directionally to primary storage 706 and provides additional data storage capacity and may include any of the computer-readable media described above. Mass storage device 708 may be used to store programs, data and the like and is typically a secondary storage medium such as a hard disk. Frequently, such programs, data and the like are temporarily copied to primary memory 706 for execution on CPU 702. It will be appreciated that the information retained within the mass storage device 708, may, in appropriate cases, be incorporated in standard fashion as part of primary storage 704. A specific mass storage device such as a CD-ROM 714 may also pass data uni-directionally to the CPU or primary storage.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognition peripherals, USB ports, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

In one embodiment, a system such as computer system 700 is used as a biological classification tool that employs gradient determination, thresholding, and/or morphology characterization routines for analyzing image data for biological systems. System 700 may also serve as various other tools associated with biological classification such as an image capture tool. Information and programs, including image files and other data files can be provided via a network connection 712 for downloading by a researcher. Alternatively, such information, programs and files can be provided to the researcher on a storage device.

In a specific embodiment, the computer system 700 is directly coupled to an image acquisition system such as an optical imaging system that captures images of cells or other biological features. Digital images from the image generating system are provided via interface 712 for image analysis by system 700. Alternatively, the images processed by system 700 are provided from an image storage source such as a database or other repository of cell images. Again, the images are provided via interface 712. Once in apparatus 700, a memory device such as primary storage 706 or mass storage 708 buffers or stores, at least temporarily, digital images of the cells. In addition, the memory device may store phenotypic characterizations associated with previously characterized biological conditions. The memory may also store various routines and/or programs for analyzing and presenting the data, including identifying individual cells as well as the boundaries of such cells, characterizing the cells as live or dead, extracting morphological features (e.g., the shape of mitotic spindles), presenting stimulus response paths, etc. Such programs/routines may encode algorithms for characterizing intensity levels at various channels, performing thresholding and watershed analyses, performing statistical analyses, identifying edges, characterizing the shapes of such edges, performing path comparisons (e.g., distance or similarity calculations, as well as clustering and classification operations), principal component analysis, regression analyses, and for graphical rendering of the data and biological characterizations.

OTHER EMBODIMENTS

Although the above has generally described the present invention according to specific processes and apparatus, the present invention has a much broader range of implementation and applicability. For example, while the methodology of this invention has been described in terms of a cytoskeletal component (e.g., tubulin) as a live-dead indicator, the inventive methodology is not so limited. For example, the invention could easily be extended to other indicators found to correlate with live/dead cells such as overall protein content in a cell. As indicated, it will generally be preferable, though not necessary, that such indicators be elucidated in cells that have been fixed and marked after exposure to a stimulus under investigation and prior to imaging. Those of ordinary skill in the art will recognize other variations, modifications, and alternatives.

What is claimed is:

1. A method of distinguishing live cells from dead cells in a population of cells, the method comprising:
    (a) providing one or more images of tubulin in a population of cells, wherein the image provides luminescence or fluorescence from a marker that co-locates with the tubulin when applied to living or dead cells;
    (b) automatically analyzing said one or more images to determine, for at least some cells in said population of cells, the fluorescent or luminescent intensity of the tubulin marker; and
    (c) automatically classifying said at least some cells as live or dead by comparing the intensity of the tubulin marker to a predetermined mixture model of two Gaussian distributions, wherein a higher mean intensity of tubulin indicates live cells, and a lower mean intensity of tubulin indicates dead cells.

2. The method of claim 1, further comprising automatically segmenting the image into individual cells prior to step (b).

3. The method of claim 1, further comprising:
    (d) extracting a morphological feature of the cells in the image; and
    (e) determining the degree to which the morphological feature occurs separately in at least one of live cells and dead cells.

* * * * *